United States Patent [19]
Shearer

[11] Patent Number: 5,852,332
[45] Date of Patent: Dec. 22, 1998

[54] SHEER POWER SOURCE

[75] Inventor: John W. Shearer, Titusville, Fla.

[73] Assignee: Sheer Power Source, Inc., Titusville, Fla.

[21] Appl. No.: 709,301

[22] Filed: Sep. 9, 1996

[51] Int. Cl.⁶ .................................................. H02J 7/00
[52] U.S. Cl. ............................. 307/43; 307/80; 307/85; 307/86; 361/724; 320/103
[58] Field of Search .................. 320/15, 19, 20, 320/21, 37, 61, 62; 361/600, 601, 679, 724, 725, 726, 727, 625, 622, 641; 307/150, 43, 45, 88, 46, 85, 86, 139, 140–141.4; 363/109; 364/492, 707, 273.1, 273.5, 273, 948.4, 948.8, 948.91

[56] References Cited

U.S. PATENT DOCUMENTS

| | | | |
|---|---|---|---|
| 2,309,054 | 1/1943 | Fell | 320/15 |
| 2,857,558 | 10/1958 | Fiske | 361/727 |
| 3,217,225 | 11/1965 | Gottlieb et al. | 320/37 |
| 3,621,276 | 11/1971 | Cyrill John Mitchell | 307/141 |
| 3,693,050 | 9/1972 | Ettinger et al. | 361/715 |
| 3,863,949 | 2/1975 | Clark | 280/156 |
| 4,007,591 | 2/1977 | Hinchman et al. | 60/325 |
| 4,013,302 | 3/1977 | Oswald | 280/154.5 R |
| 4,445,700 | 5/1984 | Schroeder | 280/154.5 R |
| 4,477,764 | 10/1984 | Pollard | 307/84 |
| 4,723,099 | 2/1988 | Herzig | 307/140 |
| 5,080,397 | 1/1992 | Metcalf | 280/851 |
| 5,100,177 | 3/1992 | Becker | 280/851 |
| 5,288,961 | 2/1994 | Shibuya et al. | 361/695 |
| 5,402,007 | 3/1995 | Center et al. | 123/339 |
| 5,444,352 | 8/1995 | Hutchings | 320/15 |
| 5,504,378 | 4/1996 | Lindberg et al. | 361/722 |
| 5,513,718 | 5/1996 | Suzuki et al. | 320/1 |
| 5,581,171 | 12/1996 | Kerfoot et al. | 320/39 |
| 5,631,821 | 5/1997 | Muso | 361/709 |

*Primary Examiner*—Jeffrey A. Gaffin
*Assistant Examiner*—Peter Ganjian
*Attorney, Agent, or Firm*—Brian S. Steinberger; Law Offices of Brian S. Steinberger

[57] ABSTRACT

A power supply for maximizing the life of batteries such as but not limited to 12 volt DC batteries. Two batteries are preferably used. A timer is connected to the first battery output terminals. The timer regulates when a DC motor is turned on and off. The motor is connected to alternator connected to an output of the DC motor. The second battery is connected to and receives a charge from the alternator. An invertor outputs 115 volts at approximately 800 to approximately 1500 watts at 60HZ. The invention allows the first battery and the second battery to have an increased lifespan compared to being used separately. Embodiments for using the invention include computer set-ups, electrical golf carts, electrical car, medical devices, emergency backup power supply, and a portable canister supported container.

20 Claims, 7 Drawing Sheets

*A = CTX COLORMONATOR DOT 28
*B = 486-DX2 - 33 MHZ - 8 MEGA RAM 1.2 GIG HARDDRIVE
    14.4 FAX/DATA MODEM, 250 MB TAPE BACKUP, CD ROM
    RUNNING ON OS WINDOWS 3.1
*C = PANASONIC 2123 DOT MATRIX COLOR PRINTER
*D = PANASONIC - KX - F555 TELEPHONE/FAX
*E = LAMP - 25 WATT

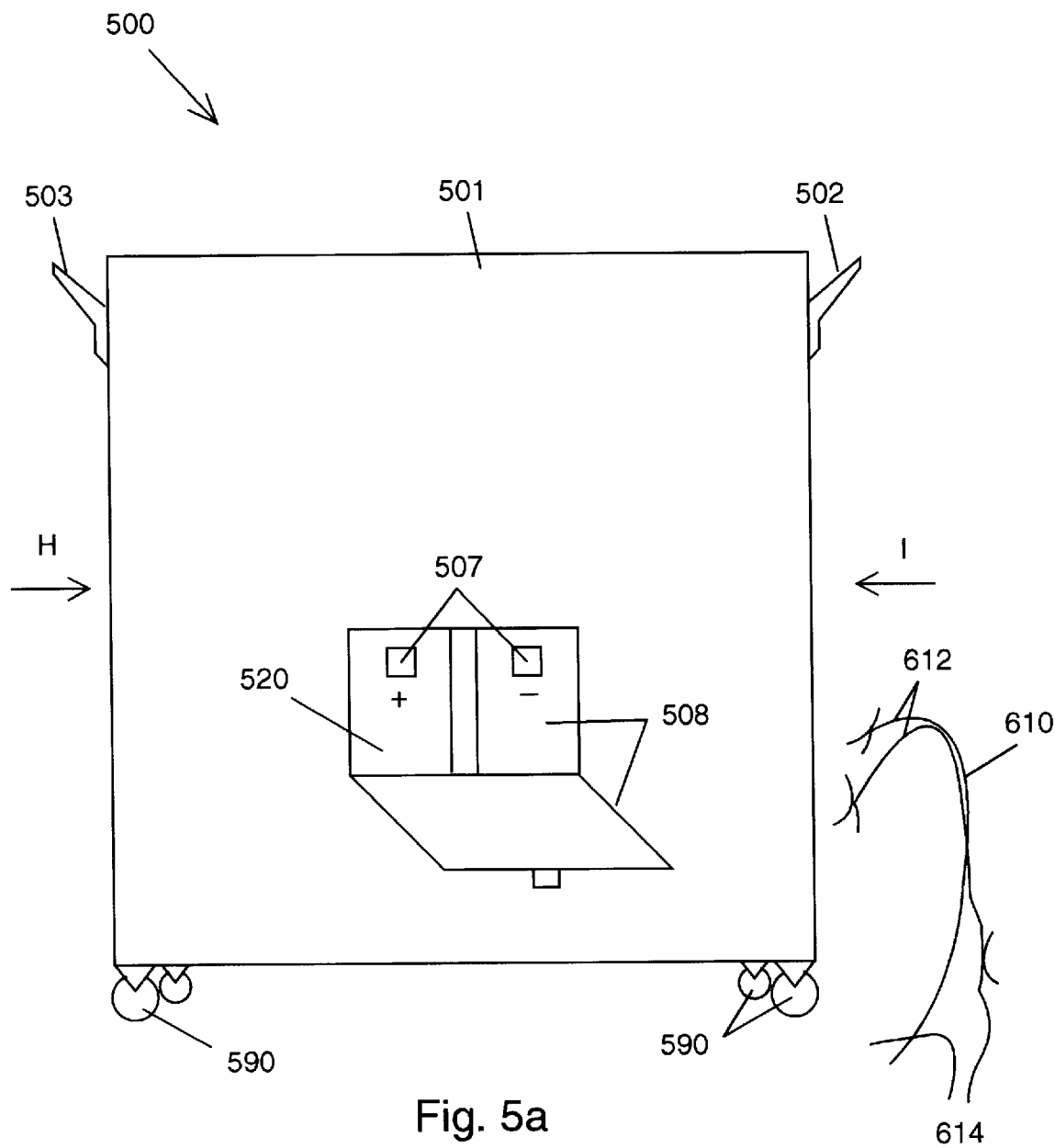
Fig. 5a
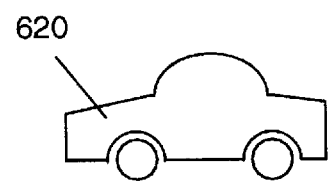

SHEER POWER SOURCE

This invention relates to batteries, and in particular to a method and system for increasing the efficiency and useable lifespan of the batteries.

BACKGROUND AND PRIOR ART

Storage batteries are known to have a limited lifespan of use. For example, traditional 12 volt batteries with a 800 Watt continuous drain can have a lifespan that lasts up to approximately 45 minutes before running out. Automobiles have used alternators to constantly recharge the vehicle batteries while the engine is running. However, these alternators require the engine to be running from a separate fuel source supply such as gasoline.

Attempts have been made to maximize the life of vehicle batteries. See for example U.S. Pat. Nos. 5,397,991 to Rogers; 5,245,267 to Perret et al.; and 5,162,720 to Lambert. However, these systems are limited to vehicles with internal combustion type engines.

Other types of patents have been proposed that include elaborate switching relays, multiple batteries and external power sources. See for example U.S. Pat. Nos. 5,463,304 to Winters, 5,418,433 to Nilssen; 4,667,142 to Butler; 4,297,590 and 4,101,787 to Vail.

SUMMARY OF THE INVENTION

The first objective of the present invention is to provide a circuit for increasing the efficiency and lifespan of batteries.

The second object of this invention is to provide a portable AC power source for extending the life of batteries without the noise, pollution, combustible fuel and inconvenience of gasoline powered generators.

The third object of this invention is to provide a portable AC power source for extending the life of batteries without using external electrical power supplies.

Further objects and advantages of this invention will be apparent from the following detailed description of a presently preferred embodiment which is illustrated schematically in the accompanying drawings.

BRIEF DESCRIPTION OF THE FIGURES

FIG. 5a is front view of a portable case embodiment having the schematic invention of FIG. 1.

FIG. 5d is an interior view of the portable case embodiment of FIG. 5a.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
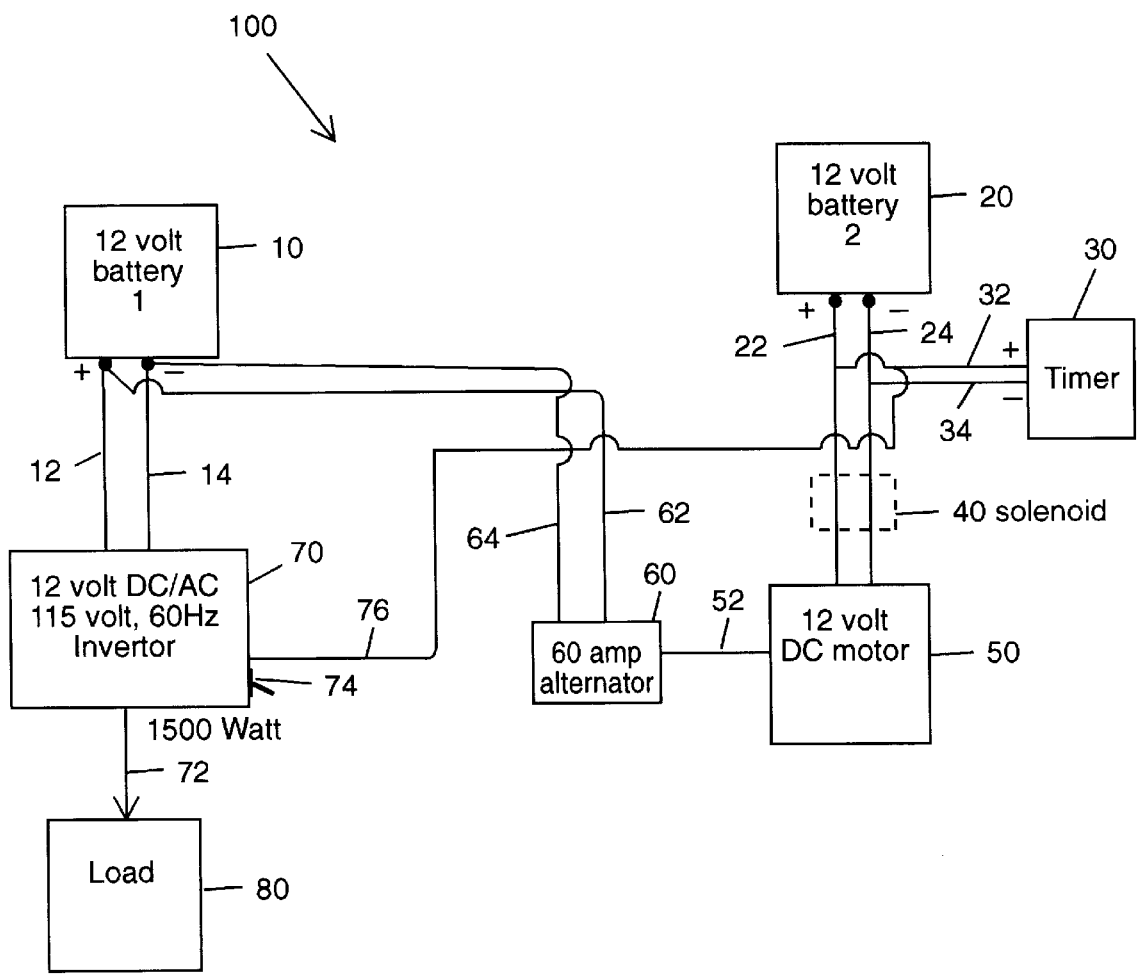
FIG. 1 is a schematic figure of a preferred embodiment of the subject invention.

FIG. 1 is a schematic figure of a preferred embodiment 100 of the subject invention, and include two 12 volt batteries 10 and 20 respectively. The components of FIG. 1 will now be described. Batteries 10, 20 can be 12 Volt DC 855CCA Lead acid batteries. Each battery 10, 20 can have an individual lifespan of approximately 45 minutes. Timer 30 can be a clock that runs for one minute every 20 minutes. Timer 30 can be a programmable relay timer manufactured by the NTE Co. model R61-11ADAM10-112. Solenoid 40 can be a 12 volt DC continuous run solenoid. Motor 50 can be a 12 volt DC 1800 rpm continuous run motor. Alternator 60 can be a 60 amp alternator with regulator such as the conventional alternators and electric generators which supply a Direct Current (D.C) output charge described in U.S. Pat. No. 4,477,764 to Pollard, which is incorporated by reference. Invertor 70 can be 12 volt DC-115 volt AC invertor(800 watt—1500 watt) with 60 Hz modified sign wave. Toggle on/off switch 74 activates invertor 70 and controls when timer 30 is activated to run embodiment 100. Load 80 in FIG. 1 can be a 486 Dx2 computer and printer power supply.

The operation of FIG. 1 will now be described. Switching toggle switch 74 on, battery 10 supplies voltage through lines 12, 14 to invertor 70 which inverts from 12 volts DC to 115 volts AC 60 Hz supplying power(at 800 watts) by line 72 to load 80 that requires 115 volts AC at 60 Hz for operation. Battery 20 supplies power by conductor lines 22, 24 through timer 30 which is energized when invertor 70 is turned on. Battery 20 supplies 12 volts DC to solenoid 40 which when switched on by timer 30 supplies 12 volts DC to motor 50 which through direct drive 52 turns on alternator 60 supplying a 12 volt DC charge of 60 amps through lines 62, 64 to battery 10 for one minute every twenty minutes(as per the operation of timer 30 explained previously). With this circuit, battery 10 runs at least 12.6 volts output for the life of battery 20. As previously discussed, each battery 10, 20 can have individual lifespans of approximately 45 minutes each or a 1 and ½ hours combined lifespan(being used separately). With FIG. 1, the life of battery 10 has 20 times or 20 charges. The combined lifespan of both batteries 10, 20 with FIG. 1 is approximately 4 and ½ hours(which is 300% greater than using batteries 10, 20 separately).

Figure 2:
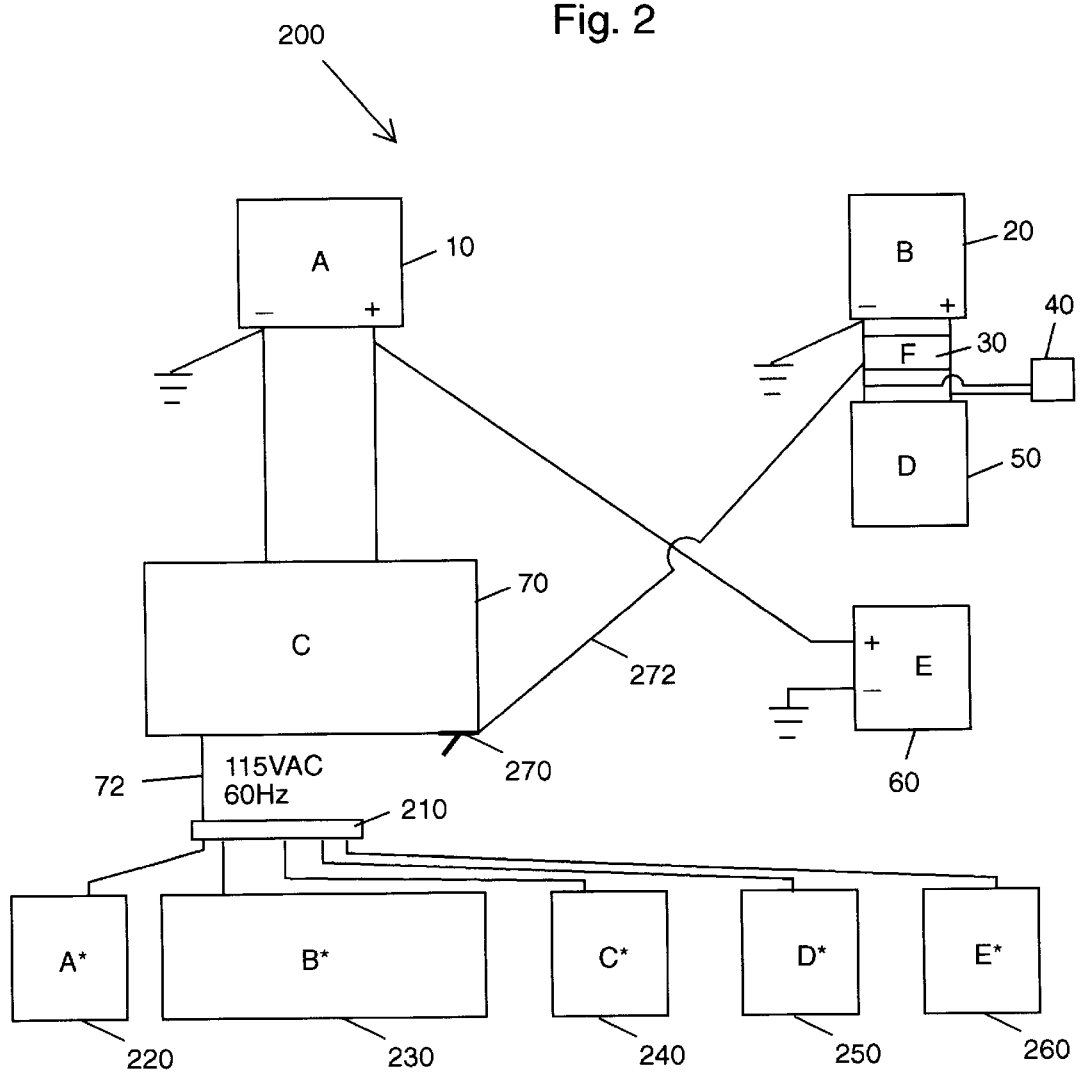
FIG. 2 is a circuit schematic of the embodiment of FIG. 1 for use with running a computer.

FIG. 2 is a circuit schematic 200 of the embodiment of FIG. 1 for use with running computer equipment. Component 220 can be a CTX Color monitor Dot 28. Hardrive 230 can be a IBM compatible 486 DX2-33 MHZ, 8 Meg Ram 1.2 Gig Hardrive with 14.4 Facsimile/data modem and 250 MB Tape backup CD ROM running on OS WINDOWS 3.1. Component 240 can be a Panasonic 2123 DOT Matrix Color Printer. Component 250 can be Panasonic KX-F555 Telephone/Facsimile. Component 260 can be a 25 Watt Lamp. As previously discussed in FIG. 1, output 72 supplies 115 volts AC at 60 Hz by a circuit similar to FIG. 1, to a power strip 210 which distributes power to components 220, 230, 240, 250 and 260. FIG. 2 can include a separate on and off switch 270 on invertor 70 which controls when timer 30 is activated.

Figure 3:
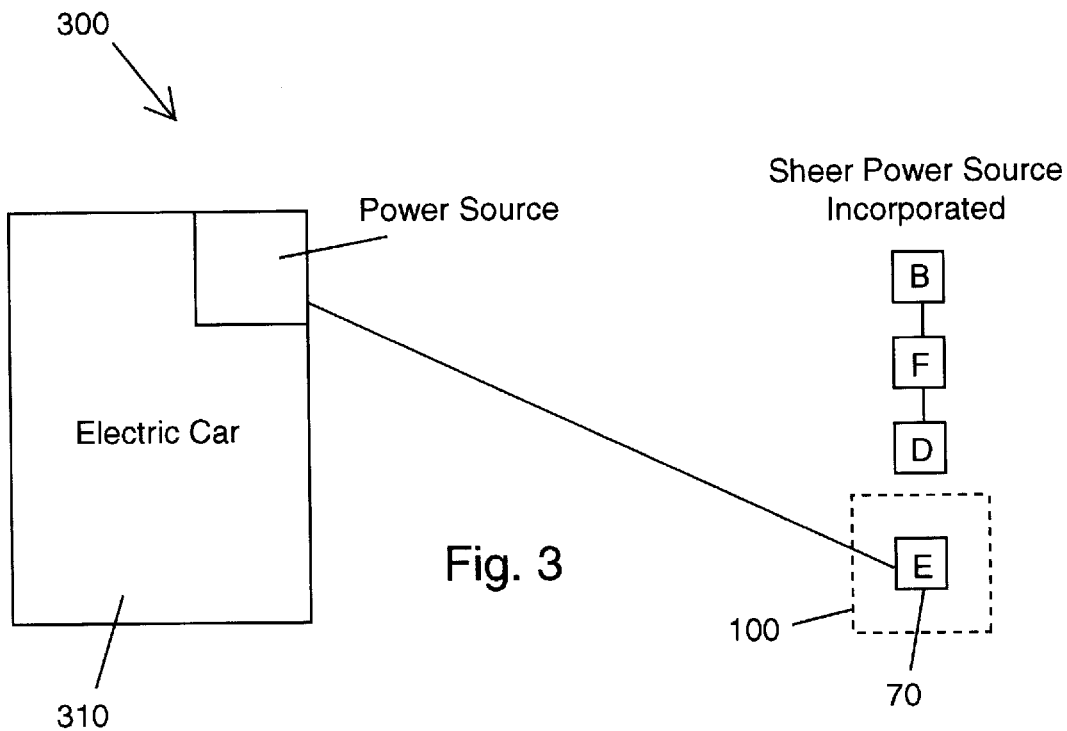
FIG. 3 is another preferred use of running the power source invention of FIG. 1 in an electric car.
Figure 4:
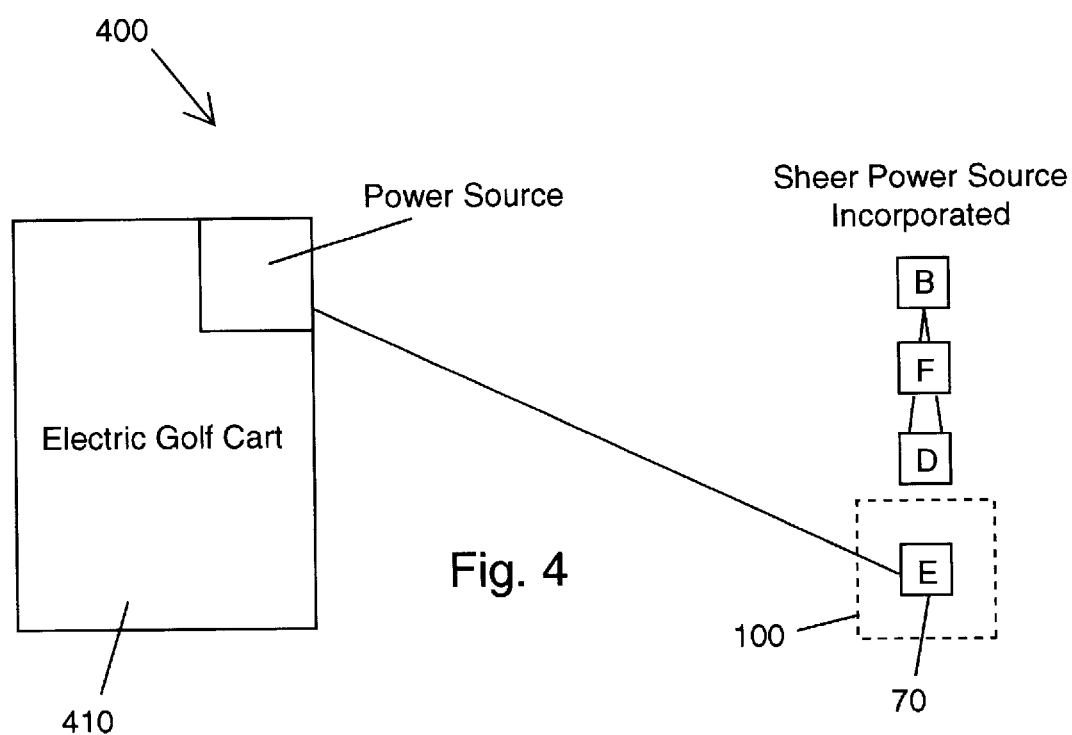
FIG. 4 is still another use of running the power source of FIG. 1 with an electric golf cart.

FIG. 3 is another preferred embodiment 300 of running the power source invention of FIG. 1 with an electric car that is totally powered by a battery power supply. FIG. 4 is still another embodiment 400 of running the power source of FIG. 1 with an electric golf cart 410.

Figure 5B:
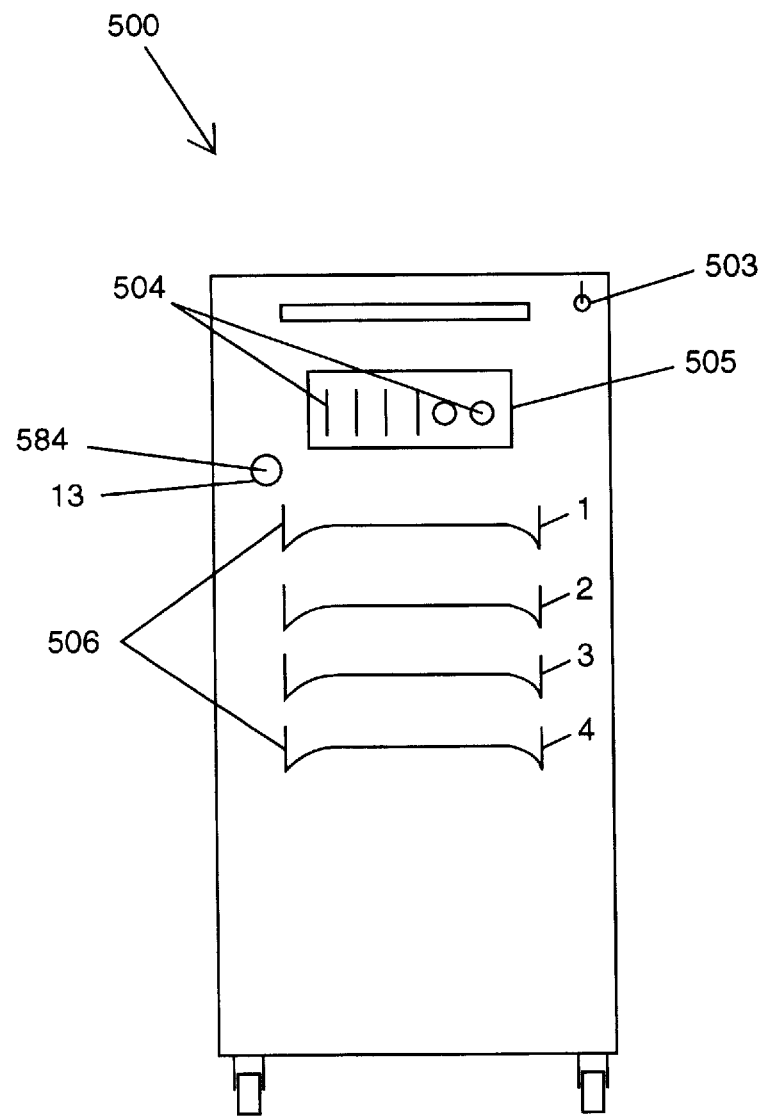
FIG. 5b is a side view of the portable case embodiment of FIG. 5a along arrow H.
Figure 5C:
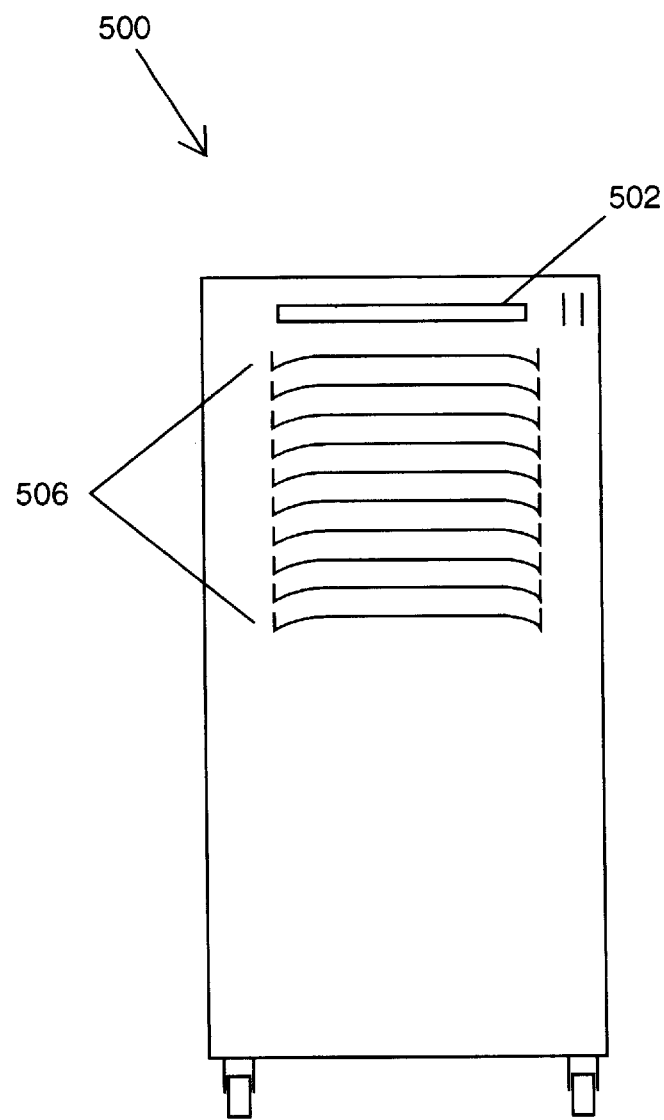
FIG. 5c is a side view of the portable case embodiment of FIG. 5a along arrow I.

FIG. 5a is front view of a portable mobile case power supply embodiment 500 having the schematic invention of FIG. 1. FIG. 5b is a side view of the portable case embodiment of FIG. 5a along arrow H. FIG. 5c is a side view of the portable case embodiment of FIG. 5a along arrow I. Referring to FIGS. 5a–5c, container 500 includes a metal rectangular shaped housing 501 which can be formed from aluminum, galvanized steel, stainless steel, molded plastic, and the like, having at least two oppositely attached side handles 502, 503 for allowing the container 501 to be movable over the ground by bottom attached caster wheels 590. The sides of container 501 can include approximately one inch wide by approximately five inches long louvers 506 for allowing outside air to cool the interior components of container 500. A face plate 505 has on and off button switches 504 for turning on and off power supply embodiment 500. Monitoring lights can be incorporated on invertor 550 that represent the current battery voltage and useage of each battery. Optionally, a hinged side access panel 508 can be included that opens up to two spade connectors 507 which is connected to battery 520 there underneath. Ends 612 of automobile jumper cables 610 can be connected to spade connectors 507, and the other ends 614 can be connected to a running vehicle battery 620 in order to recharge batteries 520, 510 when the batteries run down.

Figure 5D:
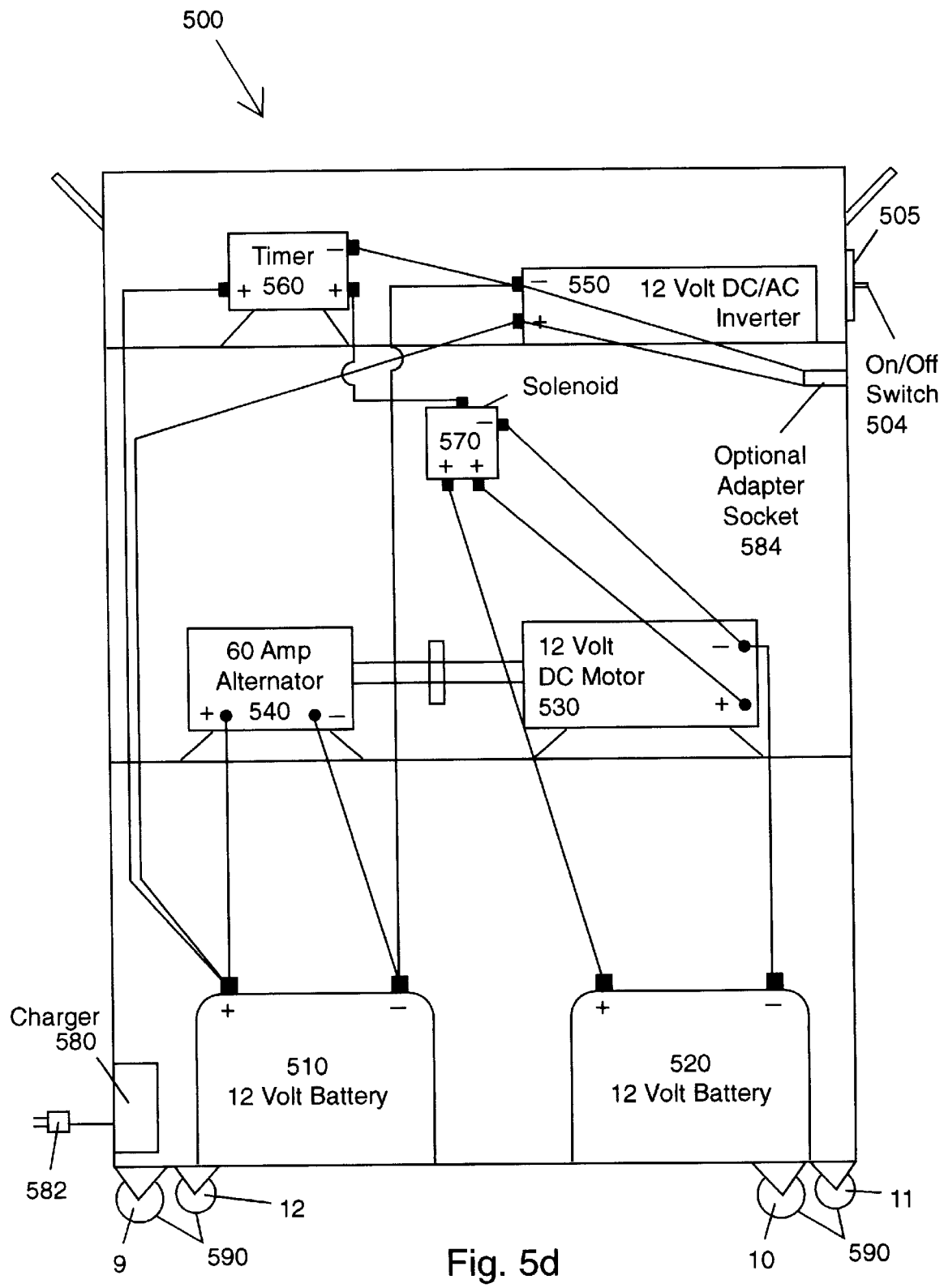

FIG. 5d is an interior view of the portable case embodiment of FIG. 5a. Batteries 510, 520 can be 12 volt DC 855 CCA Lead Acid batteries. The enclosed components correspond to those of FIG. 1. Motor 530 can be a 12 volt DC 1800 rmp, 1 horse power continuous run motor attached to a 60 amp alternator and regulator 540. The invertor 550 can be a 12 volt DC to 115 volt AC 60 Hz sine wave invertor having an approximately 800 to 1500 watt output. Timer 560 can be a circuit board that both monitors the voltage level of battery A(5 10). Timer 560 can turn on 12 volt DC power to solenoid 570 to start motor 530 every twenty minutes for one minute. Timer 560 can be activated only when invertor 550 is turned on by switch 504. A 1.5 amp trickle charger 580 allows the invention to be plugged into a 120 volt household power supply via wall plug 582 when embodiment 500 is not used. An optional cigarette lighter adapter socket 584 can also be used.

The subject invention can be used as a portable battery power source to operate lights, radios(ham, CBs and broadcast stations), bug lights, fans, alarm clocks, portable phones, and portable televisions for home use or during camping trips.

The portable battery power source can be used as an emergency power supply for equipment such as power supplies for medical device equipment such as but not limited to infant monitors, oxygen machines, I.V. machines and heart monitors.

The increased efficiency and lifespan of the battery power supply can be used to provide uninterrupted power small to midrange computers such as but not limited to MACs and IBM compatible laptops and the like, file servers, facsimile machines, typewriters, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A power supply for maximizing the life of batteries comprising:

a first battery having output terminals;

a relay timer clock connected to the first battery output terminals, the relay timer clock switching on for a first selected time after every down selected time;

a DC motor, connected to the first battery output terminals, the relay timer clock regulating when the DC motor is turned on and off;

an alternator outputting a DC charge connected to an output of the DC motor;

a second battery connected to and receiving the DC charge; and an invertor for outputting the voltage from the second battery to a load, wherein the relay timer clock continuously switches on the first battery for the first selected time after every down selected time again and again over the lifespan of the first battery and the second battery, and the first battery and the second battery have an increased lifespan compared to being used separately.

2. The power supply of claim 1, wherein the relay timer clock is selected to run approximately 1 minute for approximately every 20 minutes.

3. The power supply of claim 2, wherein the DC motor further includes:

a 12 volt DC motor.

4. The power supply of claim 3, wherein the alternator further includes:

a 12 volt 60 amp alternator.

5. The power supply of claim 4, wherein the invertor further includes:

a 12 volt DC to AC invertor having approximately 800 to 1500 WATT output.

6. The power supply of claim 5, wherein the output increases the combined life of the first battery and the second battery approximately 300%.

7. The power supply of claim 1, wherein the first battery and the second battery each include: 12 volt batteries.

8. The power supply of claim 1, wherein the load includes:

a computer.

9. The power supply of claim 1, wherein the load includes:

an electric car.

10. The power supply of claim 1, wherein the load includes:

an electric golf cart.

11. The power supply of claim 1, further comprising:

a mobile storage container for housing the first battery, the second battery, the relay timer clock, the DC motor, the alternator and the invertor.

12. The power supply of claim 11, the mobile storage container includes:

caster wheels attached beneath the container.

13. The power supply of claim 11, the mobile storage container includes:

an exterior face plate having an on and off switch thereon.

14. The power supply of claim 11, the mobile storage container includes:

an external plug for being charged with a household power source.

15. The power supply of claim 11, the mobile storage container includes:

a cigarette light adapter socket.

16. The power supply of claim 11, the mobile storage container includes:

louvered air vent sidewalls.

17. The power supply of claim 11, the mobile storage container includes:

handles attached to upper edges of the container.

18. A mobile power supply for maximizing the life of batteries comprising:

a first battery having output terminals;

a relay timer clock connected to the first battery output terminals, the relay timer clock switching on for a first selected time after every down selected time;

a DC motor, connected to the first battery output terminals, the relay timer clock regulating when the DC motor is turned on and off;

an alternator outputting a DC charge connected to an output of the DC motor;

a second battery connected to and receiving the DC charge; and an invertor for outputting the voltage from the second battery to a load, wherein the relay timer clock continuously switches on the first battery for the first selected time after every down selected time again and again, over the lifespan of the first battery and the second battery, and the first battery and the second battery have an increased lifespan compared to being used separately;

a mobile storage container for housing the first battery, the second battery, the relay timer clock, the DC motor, the alternator and the invertor;

wheels attached beneath the container;

an on and off switch;

an external recharging plug, the plug chosen from at least one of a household wall plug, and a cigarette lighter adapter;

air vent sidewalls on the container; and handles attached to upper edges of the container for allowing the container to be rolled on the ground by the user.

19. A portable power supply for maximizing the life of 12 volt batteries comprising:

a first 12 volt battery having output terminals;

a programmable relay timer clock connected to the first battery output terminals, the relay timer switching on for a first selected time after every down selected time;

a 12 volt DC motor, connected to the first battery output terminals, the relay timer clock regulating when the DC motor is turned on and off;

an 12 volt 60 amp alternator outputting a DC charge connected to an output of the DC motor;

a second 12 volt battery connected to and receiving the DC charge; and a 12 volt DC to AC invertor having approximately an 800 to 1500 WATT output for outputting the voltage from the second battery to a load, wherein the relay timer clock continuously switches on the first battery for the first selected time after every down selected time again and again, over the lifespan of the first battery and the second battery, and the first battery and the second battery have an increased lifespan of approximately 300% together compared to being used separately.

20. The portable power supply of claim 19, wherein the relay timer clock is selected to run:

approximately 1 minute for approximately every 20 minutes.

* * * * *